United States Patent
Holly

[11] 3,728,761
[45] Apr. 24, 1973

[54] FASTENER
[75] Inventor: James A. Holly, Richton Park, Ill.
[73] Assignee: Hollymatic Corporation, Park Forest, Ill.
[22] Filed: June 22, 1971
[21] Appl. No.: 155,476

[52] U.S. Cl. .....................24/73, 85/80, 151/41.73, 151/41.75
[51] Int. Cl. ....A44b 21/00, F16b 13/04, F16b 39/24
[58] Field of Search .......................85/80; 151/41.73, 151/41.75; 24/73

[56] References Cited

UNITED STATES PATENTS

| | | | |
|---|---|---|---|
| 3,137,336 | 6/1964 | Wing | 151/41.73 |
| 3,449,799 | 6/1969 | Bien | 85/80 X |
| 3,469,493 | 9/1969 | Fischer | 85/80 X |
| 3,534,797 | 10/1970 | Reinhard | 151/41.75 |

Primary Examiner—Paul R. Gilliam
Attorney—Axel A. Hofgren et al.

[57] ABSTRACT

A fastener attachable to an article in an opening therein in which the fastener has two parts, an inner part and an outer part, with interengaging means permitting longitudinal adjustment of the over-all length of the fastener, grasping elements on each of these parts engaging the opposite side surfaces of the article when the fastener is in position in an opening in the article and a securing bolt extending from one surface of the article into the fastener and engaging the inner part as a nut with the bolt on rotation expanding the grasping elements of the inner part to engage the inner surface and drawing the parts toward each other to press the respective grasping elements of both parts into secure engagement with their respective surface areas on the article, the bolt being easily removable from the fastener so that the inner and outer parts may be removed as desired from their positions in the article opening.

6 Claims, 8 Drawing Figures

Patented April 24, 1973

INVENTOR.
JAMES A. HOLLY
BY Hofgren, Wegner, Allen,
Stellman & McCord.
ATTORNEYS.

Patented April 24, 1973 3,728,761
2 Sheets-Sheet 2
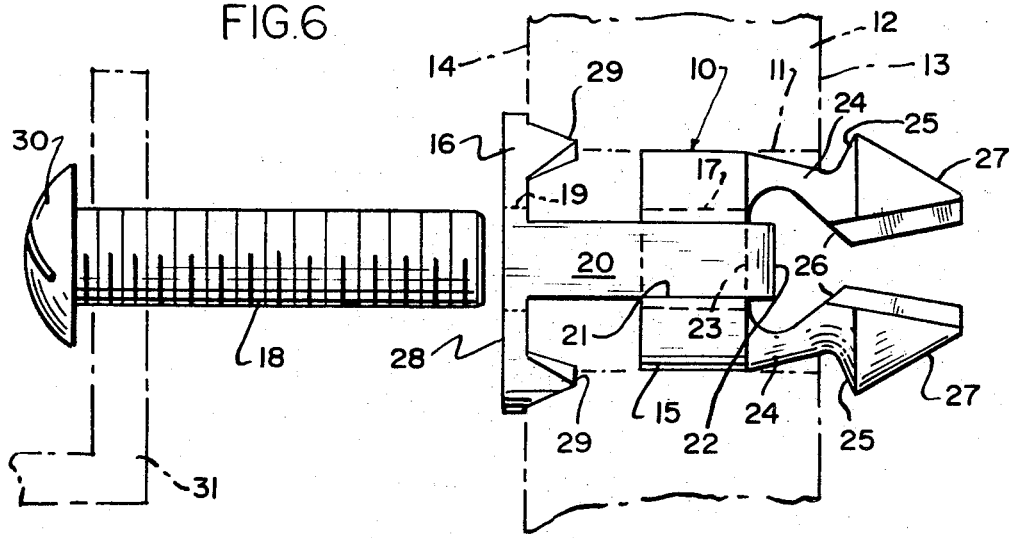
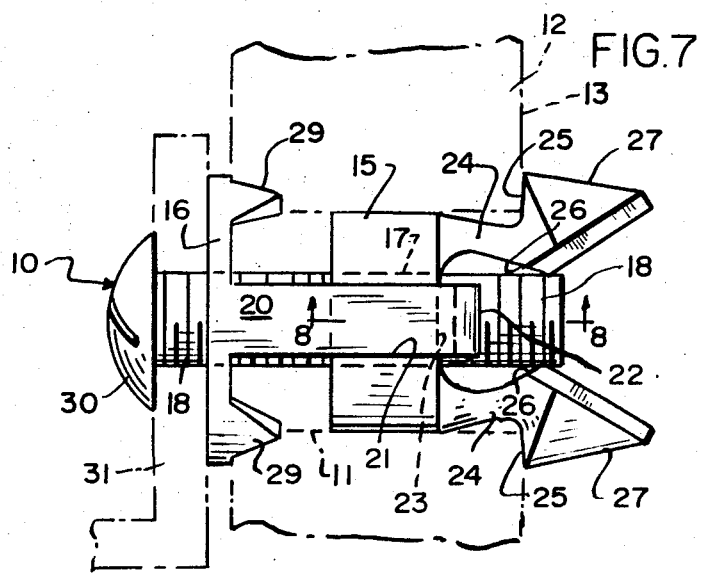
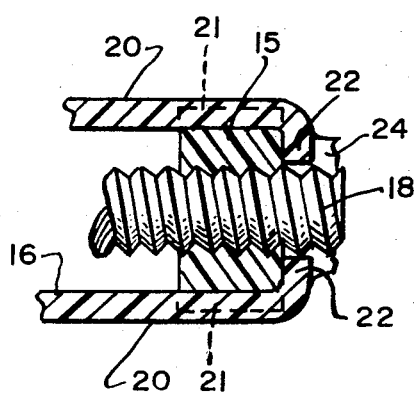

FASTENER

BACKGROUND OF THE INVENTION

One of the features of this invention is to provide an improved two part fastener for securing in an opening in an article having opposite surfaces in which the parts are adjustable longitudinally relative to each other to adjust the over-all length of the fastener, the fastener includes a securing and expanding element such as a threaded bolt extending through an outer part of the fastener and into the inner part for expanding the portions of the inner part into engagement with surface areas of the article surrounding the opening, drawing the two parts together to grasp securely the opposite surface areas of the article and to permit withdrawal of the fastener from the article when desired upon removal of the securing element.

Other features and advantages of the invention will be apparent from the following description of one embodiment thereof and the accompanying claims.

Although there are many patents and publications relating to fasteners securable in an opening in an article such as a wall, a board or the like, none of them of which applicant is aware has the versatility, strength, easy attaching and removing features as well as the other features of this invention. The most pertinent prior patents of which applicant is aware are U.S. Pat. Nos. 1,711,453; 3,099,931; 3,112,547 and 3,193,921.

BRIEF DESCRIPTION OF THE DRAWINGS

FIG. 6 is a side elevational view of the assembled fastener parts in position in an opening in a wall and prior to the insertion of a bolt.

FIG. 7 is a view similar to FIG. 6 but illustrating the fastener parts in locked position.

FIG. 8 is a fragmentary sectional view taken substantially along line 8—8 of FIG. 7.

DESCRIPTION OF THE PREFERRED EMBODIMENT

In the embodiment shown in the accompanying drawings the fastener 10 is shown attached in a fastener receiving opening 11 in an article 12 that is illustrated in FIGS. 6 and 7 in broken lines. One example of such an article is a wall. Although the article 12 is illustrated in this embodiment as comprising a single thickness article it will be obvious from the following description of this embodiment that the invention may be used to attach together several superposed articles.

Figure 3:
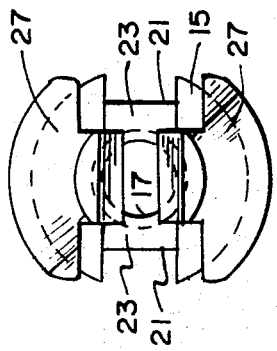
FIG. 3 is an end elevational view of the right end of FIG. 1.
Figure 1:
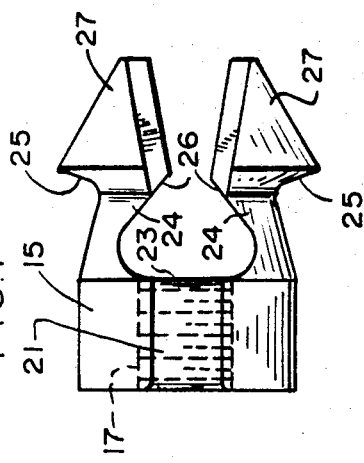
FIG. 1 is a side elevational view of a first or inner part of a fastener embodying the invention.
Figure 2:
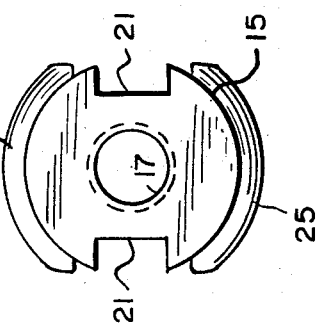
FIG. 2 is an end elevational view taken from the left end of FIG. 1.

The article 12 as illustrated has a first or inner surface 13 and a second or outer surface 14 with the opening 11 extending between these two surfaces. The fastener 10 comprises a first or inner part 15 and a second or outer part 16. These parts have aligned axial openings in the assembled fastener as is shown in FIGS. 1–3 for the first part 15 and similar detail FIGS. 4 and 5 for the second part 16. The opening 17 in the first part 15 is threaded so that the part 15 operates as a nut on the bolt 18 which functions as a securing means as later described. The opening 19 on the second or outer part 16 is unthreaded so that the bolt can pass freely therethrough.

Interengaging means are provided on the parts 15 and 16 for providing longitudinal adjustment of the over-all length of the assembled parts. Although any interengaging means desired may be used such as a pin and slot and the like for permitting this adjustment of the over-all length one type of engaging means is illustrated in the embodiment of the drawings. Thus as illustrated the second or outer part 16 of the fastener is provided with a plurality of branches 20 here shown as two oppositely located branches that engage oppositely located grooves 21 on the inner part 15. Thus the pair of branches 20 and the similar pair of grooves 21 provide guided movement of the parts relative to each other.

Figure 5:
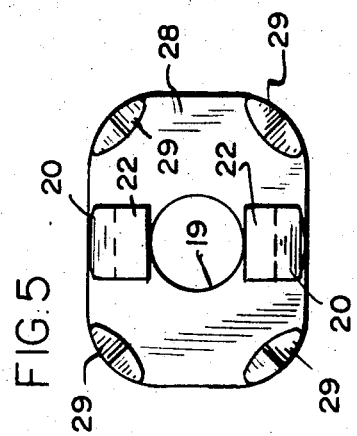
FIG. 5 is an end elevational view taken from the right end of FIG. 4.
Figure 4:
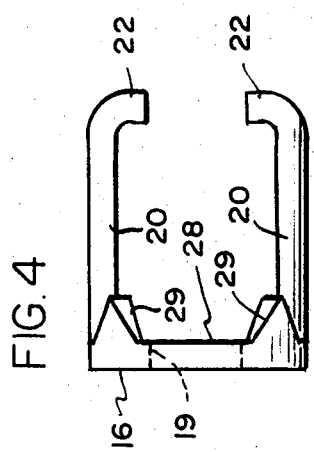
FIG. 4 is a side elevational view of the second or outer part of the fastener embodying the invention.

As shown in FIGS. 4 and 5 the branches 20 which are substantially parallel to each other are provided on their inner ends with inturned stop members in the form of coplanar flanges 22 with each flange being integral with the inner end of a branch 20. These flanges 22 engage the corresponding surface areas 23 on the inner part 15 of the fastener as illustrated in FIG. 6 to limit the extent of maximum movement of the two parts relative to each other and thus the over-all maximum length of the assembled fastener parts.

Each of the two parts 15 and 16 of the fastener is provided with grasping means for engaging the respective areas 13 and 14 when the fastener is in position in the opening. In the illustrated embodiment the grasping means on the first part 15 comprises a plurality, here shown as two, of laterally movable elements 24 that are bendable toward and away from each other for passage through the opening 11 as illustrated in FIG. 6 and for enlargement relative to the opening as illustrated in FIG. 7. The inner ends of these elements or legs 24 are provided with laterally projecting surface portions 25 that extend beyond the opening 11 when the elements 24 have been expanded into locked position as shown in FIG. 7 and therefore function as securing means.

The laterally movable securing elements of the inner part 15 are provided with first cam surface means 26 engaged by the bolt 18 as shown in FIG. 7 for expanding the elements 24 into locked position. The elements 24 are also provided with two cam surface means 27 for camming the elements 24 toward each other when passing the inner part 15 of the fastener into and through the opening 11 or from left to right as shown in FIG. 6.

The outer or second part 16 of the fastener is also provided with grasping means for engaging the outer surface 14 of the article 12 with these being illustrated in this embodiment as a flat base 28 that engages the article surface 14 as shown in FIGS. 6 and 7 and four inwardly directed spurs 29 that dig into the article or wall 12 so as simultaneously to prevent rotation of the entire fastener when it is in position as shown in FIGS. 6 and 7. Other rotation preventing means desired may, of course, be used such as by providing wall engaging spurs on the inner or first part 15 of the fastener.

The fastener of this invention also includes a securing means extending from adjacent the outer or second surface 14 into the axial openings 17 and 19 and serving to expand the laterally movable expandable elements or legs 24 into locking position as shown in FIG. 7 and for drawings the parts 15 and 16 toward each other also as shown in FIG. 7. As stated earlier, the securing means illustrated comprises a threaded bolt 18 extendable through the opening 19 of the outer part 16 and engaging the threads of the opening 17 of the inner part 15 as a nut. This bolt 18 has an outer head 30 usable in the normal manner for rotating the bolt and also for securing an element such as a bracket 31 to the surface 14 of the article or wall 12. In installing the fastener within an opening illustrated at 11 the two parts 15 and 16 are assembled as shown in FIG. 6 with the branches 20 arranged in the grooves 21 on opposite sides of the inner part 15 of the fastener. The bolt 18 is then inserted through the opening 19 of the outer part 16 into threaded engagement with the opening 17 of the fastener part 15. The bolt can then be used to manipulate the assembled parts of the fastener and to force the elements or legs 24 into and through the wall opening 11 to the position shown in FIG. 6. If desired, the bolt 18 can then be removed for assembly with the bracket 31 and then reinserted into the fastener part 15 as described or the bracket 31 can be assembled on the bolt, the bolt then engaged with the fastener part 15 and the fastener parts moved to the position shown in FIG. 6.

Once the fastener is in position in the opening 11 the bolt 18 is then screwed into the threaded fastener part 15 to its maximum extent as shown in FIG. 7. During this movement of the bolt which in the embodiment of FIG. 7 is from the left to right the bolt engages the cam surfaces 26 to expand the elements 24 and lock the surface portions 25 against the article surface 13. At the same time the bolt draws the two parts 15 and 16 together so that the surface areas 25 and the base 28 of the fastener parts are securely locked against the article 12.

As can be seen from the above description the fastener of this invention although having two principal parts is simple and inexpensive in construction, provides a secure attachment of the fastener when it is in the opening and is easily removable from this opening when desired. In order to aid this removal the laterally projecting surface portions 25 are themselves sloped as cam surfaces as shown in FIG. 6 and therefore aid the withdrawal of the part 15 just as the surfaces 27 aid the insertion.

The parts 15 and 16 of the fastener can be made of any suitable material having the necessary strength and flexibility such as any of the many plastics available. One such is the plastic "Celcon."

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. A fastener attachable to an article having first and second spaced areas and a fastener receiving opening therebetween, comprising: a first part having an opening therein; a base portion on said first part; a second part having an opening therein; interengaging means on said parts for providing longitudinal adjustment of said parts relative to each other and thereby adjustment of the over-all length of the fastener; grasping means on each of said parts for engaging the respective said areas of said article when said fastener is in said fastener receiving opening, the grasping means on said first part comprising a plurality of laterally movable elements normally retracted for passage into said fastener receiving opening but movable laterally to engage said first area; and a securing means extending into said openings in said parts and engaging said first part both for moving laterally said movable elements and for drawing said parts toward each other to press said grasping means of both said parts into said engagement with said respective spaced areas, said interengaging means comprising a plurality of branches on said second part movably engaging the first part for guided movement of the parts relative to each other in securely pressing the grasping elements into said engagement with said spaced areas, said branches having stop members engageable with said first part when said parts are at their maximum said longitudinal adjustment, said branches being substantially parallel to each other and to said securing means, said stop members comprising inwardly directed flanges at the inner ends of said branches engaging said base portion of said first part when said parts are at their said maximum longitudinal adjustment.

2. A fastener attachable to an article having first and second spaced areas and a fastener receiving opening therebetween, comprising: a first part having an axial, threaded opening therein; a second part having an opening therein; interengaging means on said parts for providing longitudinal adjustment of said parts relative to each other and thereby adjustment of the over-all length of the fastener; grasping means on each of said parts for engaging the respective said areas of said article when said fastener is in said fastener receiving opening, the grasping means on said first part comprising a plurality of laterally movable elements normally retracted for passage into said fastener receiving opening but movable laterally to engage said first area; and a securing means extending into said openings in said parts and engaging said first part both for moving laterally said movable elements and for drawing said parts toward each other to press said grasping means of both said parts into said engagement with said respective spaced areas, said securing means comprising a threaded bolt engaging the threads of said first part as a nut and said interengaging means on said parts comprising a plurality of branches on said second part movably engaging the first part for guided movement of the parts relative to each other in securely pressing the grasping elements into said engagement with said surface areas and stop means on said branches engageable with said inner part when said parts are at their maximum said longitudinal adjustment.

3. A fastener attachable to an article having first and second spaced areas and a fastener receiving opening therebetween, comprising: a first part having an opening therein; a second part having an opening therein; interengaging means on said parts for providing longitudinal adjustment of said parts relative to each other and thereby adjustment of the over-all length of the fastener; grasping means on each of said parts for engaging the respective said areas of said article when said fastener is in said fastener receiving opening, the grasping means on said first part comprising a plurality of laterally movable elements having laterally projecting portions thereon, said movable elements being normally retracted for passage into said fastener receiving opening but movable laterally to engage said first area; and a securing means extending into said openings in said parts and engaging said first part both for moving laterally said movable elements and for drawing said parts toward each other to press said grasping means of both said parts into said engagement with said respective spaced areas, said securing means being movable longitudinally with respect to said first part and there are provided cam means on said laterally movable elements engaged by said securing means for expanding said movable elements into engagement with the first surface area, said securing means comprising a threaded bolt extending through said second part axial opening and into said first part axial opening and engaging similar threads on said first part for said longitudinal movement of the bolt on rotation of said bolt, said interengaging means on said parts comprising a plurality of branches on said second part movably engaging the first part for guided movement of the parts relative to each other in securely pressing the grasping elements into said engagement with said surface areas, said branches having stop members engageable with said first part when said parts are at their maximum said longitudinal adjustment, said branches being substantially parallel to each other and to said securing means, said stop members comprising inwardly directed flanges at the inner ends of said branches engaging a base portion of said first part when said parts are at their said maximum longitudinal adjustment.

4. A fastener attachable to an article having first and second spaced areas and a fastener receiving opening therebetween, comprising: a first part having an opening therein; a second part having an opening therein; interengaging means on said parts for providing longitudinal adjustment of said parts relative to each other and thereby adjustment of the over-all length of the fastener; grasping means on each of said parts for engaging the respective said areas of said article when said fastener is in said fastener receiving opening, the grasping means on said first part comprising a plurality of laterally movable elements normally retracted for passage into said fastener receiving opening but movable laterally to engage said first area; and a securing means extending into said openings in said parts and engaging said first part both for moving laterally said movable elements and for drawing said parts toward each other to press said grasping means of both said parts into said engagement with said respective spaced areas, said interengaging means on said parts comprising a plurality of spaced elements on said second part movably engaging the first part at similarly spaced areas thereon for guided movement of the parts relative to each other in securely pressing the grasping elements into said engagement with said spaced areas, said spaced elements having stop members engageable with said inner part when said parts are at their maximum said longitudinal adjustment.

5. The fastener of claim 1 wherein each of said branches is slidably positioned in a guide means in said base portion of the first part for confining the relative movement between said parts to longitudinal movement.

6. The fastener of claim 3 wherein each of said branches is slidably positioned in a guide means in said base portion of the first part for confining the relative movement between said parts to longitudinal movement.

* * * * *